(12) United States Patent
Sng (10) Patent No.: US 9,276,933 B2
(45) Date of Patent: Mar. 1, 2016

(54) SECURITY TOKEN CACHING IN CENTRALIZED AUTHENTICATION SYSTEMS

(71) Applicant: Sharp Laboratories of America, Inc., Camas, WA (US)

(72) Inventor: Swee Huat Sng, Torrance, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 7 days.

(21) Appl. No.: 14/137,630

(22) Filed: Dec. 20, 2013

(65) Prior Publication Data

US 2015/0180868 A1    Jun. 25, 2015

(51) Int. Cl.
*H04L 9/32* (2006.01)
*H04L 29/06* (2006.01)
*G06F 12/12* (2006.01)
*G06F 21/33* (2013.01)
*G06F 21/00* (2013.01)

(52) U.S. Cl.
CPC .......... *H04L 63/0884* (2013.01); *G06F 12/121* (2013.01); *G06F 21/33* (2013.01); *G06F 21/335* (2013.01); *H04L 9/321* (2013.01); *H04L 9/3202* (2013.01); *H04L 9/3213* (2013.01); *H04L 9/3226* (2013.01); *H04L 63/0815* (2013.01); *H04L 63/0838* (2013.01); *H04L 63/0846* (2013.01)

(58) Field of Classification Search
CPC ....... G06F 21/31; G06F 21/33; G06F 21/335; G06F 12/121; H04L 63/08; H04L 63/0807; H04L 9/3213; H04L 9/3226; H04L 9/321; H04L 9/3202; H04L 63/0815; H04L 63/083; H04L 63/0838; H04L 63/0846; H04L 63/0884
See application file for complete search history.

(56) References Cited

U.S. PATENT DOCUMENTS

| | | | |
|---|---|---|---|
| 6,715,082 B1 * | 3/2004 | Chang et al. ................. | 726/8 |
| 6,952,781 B1 * | 10/2005 | Chang et al. ................. | 726/4 |
| 7,234,157 B2 | 6/2007 | Childs et al. | |
| 7,707,416 B2 | 4/2010 | Isaacson et al. | |
| 7,707,630 B2 | 4/2010 | Childs et al. | |
| 8,087,075 B2 | 12/2011 | Peterson et al. | |
| 2003/0033535 A1 * | 2/2003 | Fisher et al. ................. | 713/185 |
| 2004/0003190 A1 | 1/2004 | Childs et al. | |
| 2006/0041669 A1 * | 2/2006 | Bemmel et al. ............. | 709/229 |
| 2006/0080546 A1 * | 4/2006 | Brannon et al. ............. | 713/185 |
| 2008/0066166 A1 | 3/2008 | Childs et al. | |
| 2008/0133914 A1 | 6/2008 | Isaacson et al. | |
| 2008/0134295 A1 * | 6/2008 | Bailey et al. ................. | 726/4 |

(Continued)

OTHER PUBLICATIONS

Giles, James, et al. "Authentication for distributed web caches." Computer Security—ESORICS 2002. Springer Berlin Heidelberg, 2002. 126-146.*

(Continued)

*Primary Examiner* — Michael Simitoski
(74) *Attorney, Agent, or Firm* — Brooks Acordia IP Law, P.C.; Pejman Yedidsion; David Ripma (57) ABSTRACT

Methods, systems, and devices for determining a time-expiry algorithm based on a cached and verified security token, a disposition of the security token, and a cache table, where the disposition of the security token is based on whether the received security token is a single-use token or a multiple-use token and where the cache table is selected from two separate cache tables.

16 Claims, 7 Drawing Sheets

(56) References Cited

U.S. PATENT DOCUMENTS

| | | |
|---|---|---|
| 2009/0007250 A1 | 1/2009 | Pouzin et al. |
| 2010/0011413 A1* | 1/2010 | Banerjee et al. .................. 726/2 |
| 2012/0047567 A1* | 2/2012 | Ishizaka ........................... 726/8 |
| 2012/0192256 A1 | 7/2012 | Peterson et al. |
| 2013/0019018 A1* | 1/2013 | Rice .............................. 709/226 |
| 2013/0057895 A1* | 3/2013 | Okazawa ..................... 358/1.14 |
| 2013/0111549 A1* | 5/2013 | Sowatskey et al. ............... 726/3 |
| 2013/0268645 A1* | 10/2013 | Shah et al. .................... 709/223 |
| 2014/0075568 A1* | 3/2014 | Sathyadevan et al. .......... 726/27 |

OTHER PUBLICATIONS

Satoh, Fumiko, and Takayuki Itoh. "Single sign on architecture with dynamic tokens." Applications and the Internet, 2004. Proceedings. 2004 International Symposium on. IEEE, 2004.*

* cited by examiner

FIG. 7 ns; caching, by the application server, the security token based on the associated cache table; and determining a time-expiry algorithm for the cache table based on the cached security token, the disposition of the security token, and associated cache table.

SECURITY TOKEN CACHING IN CENTRALIZED AUTHENTICATION SYSTEMS

SUMMARY

Embodiments of the Centralized Authentication System of the present disclosure may use a scheme of security token caching to facilitate the authentication and authentication verification needs of a secure network communication system. Embodiments may include a method of determining a time-expiry algorithm for a cache table, where the method may comprise: receiving, by a client device, a security token from an authentication server based on user credentials submitted to the authentication server; sending, by the client device, the security token to an application server; verifying, by the application server, the security token with the authentication server and determining whether to allow or deny access to the client device based on the security token verification; determining, by the application server, a disposition of the security token based on whether the received security token is a single-use token or a multiple-use token; associating, by the application server, the security token with a corresponding cache table based on the determined disposition of the token; caching, by the application server, the security token based on the associated cache table; and determining a time-expiry algorithm for the cache table based on the cached security token, the disposition of the security token, and associated cache table.

Optionally, the security token may be a token string and determined based on the authentication of the user credentials. Additionally, the method may further comprise: selecting the associated cache table for caching the security token; and storing the security token in the cache table for future retrieval. In one embodiment, the time-expiry algorithm may determine a timeout interval for the security token. In another embodiment, timeout interval for the security token having a single-use token disposition may be based on a sliding window algorithm. In yet another embodiment, the timeout interval for the security token having a multiple-use token disposition may be based on an absolute algorithm. Optionally, the timeout interval may be longer for a single-use token than the timeout interval for a multiple-use token. In addition, the cache table may be based on an expected number of concurrent active users in the system, where the cache table may be selected from two separate cache tables and the two separate cache tables may store a different number of entries from each other. That is, the two separate cache tables may be unique from each other. In one embodiment, the two separate cache tables may comprise a first cache table for storing single-use tokens and a second cache table for storing multiple-use tokens. Optionally, the method may further comprise: determining, by the application server, a timeout interval for the security token based on the determined time-expiry algorithm.

Embodiments may also include a device comprising a processor and addressable memory, the processor configured to: receive a security token from a client device; verify the security token with an authentication server and determine whether to allow or deny access to the client device based on the security token verification; determine a disposition of the security token based on whether the received security token is a single-use token or a multiple-use token; associate the security token with a corresponding cache table based on the disposition of the token, where the cache table may be selected from two separate cache tables; cache the security token based on the associated cache table; and determine a time-expiry algorithm based on the cached security token, the disposition of the security token, and associated cache table. Optionally, the device may be further configured to: save the security token to the cache table; and retrieve the security token from the cache table. Additionally, the received security token from the client device may have already been authenticated by the authentication server.

Embodiments may also include a centralized authentication system for security token caching, the centralized authentication system comprising: a first computing device, wherein the first computing device may comprise a processor and an addressable memory, the processor configured to: transmit a set of one or more user credentials associated with a user to a second computing device; receive a security token from the second computing device based on the user credentials being authenticated successfully; and send the security token to a third computing device. Additionally, the system may comprise a second computing device where the second computing device may comprise a processor and an addressable memory, the processor configured to: receive from the first computing device the set of one or more user credentials associated with the user; authenticate the received set of one or more user credentials; and validate a received security token of the user in response to a verification request from the third computing device. In addition, the system may comprise a third computing device, where the third computing device may comprise a processor and an addressable memory, the processor configured to: verify the security token with the second computing device; determine whether to allow or deny access to the first computing device based on the security token verification; determine a disposition of the security token based on whether the received security token is a single-use token or a multiple-use token; associate the security token with a corresponding cache table based on the disposition of the token, wherein the cache table is selected from two separate cache tables; cache the security token based on the associated cache table; and determine a time-expiry algorithm based on the cached security token, the disposition of the security token, and associated cache table. In one embodiment, the first computing device may be a client computing device, the second computing device may be an authentication server, and the third computing device may be an application server.

BRIEF DESCRIPTION OF DRAWINGS

Embodiments may be illustrated by way of example and not limitation in the figures of the accompanying drawings, and in which.

DETAILED DESCRIPTION

A Document Management System (DMS) may utilize a Centralized Authentication System hosted on a separate server. Many different devices and clients, for example, Multi-Function Peripheral devices (MFPs), Interactive White Boards (IWBs), web browsers, and mobile devices, e.g., mobile phone or tablet, connect to the DMS to perform document management and processing tasks. Different DMS clients authenticate with the DMS through different methods. One exemplary method that may be used is a 3-legged Single-Sign-On (SSO) process. In this method, the client either connects directly or is redirected to the authentication server. The client may submit user credentials to the authentication server, and a security token is returned to the client. The client may then submit this token to the DMS, which in turn verifies the token with the authentication server. If the token is valid, the identity of the user associated with the token is retrieved, and the user may be logged in to the system. This process ensures that the user credentials are not revealed to the DMS, or any service provider that uses a similar 3-legged authentication scheme.

In an exemplary embodiment where a single-use security token is used, subsequent DMS operations may need to be performed by the same client for the same user that has already been logged-in. In this embodiment, since the token has been invalidated after the first use—and is thus no longer in force—the token may not be used to verify the user again. In one embodiment, the client may only be available as an executable binary, i.e., the source code is not available. In an exemplary embodiment where a multiple-use security token is used, each client request to the DMS may trigger a verification request to the centralized authentication server. For chatty protocols such as Web Distributed Authoring and Versioning (WebDAV)—where WebDAV is an extension of the Hypertext Transfer Protocol (HTTP) that facilitates collaboration between users in editing and managing documents and files stored on World Wide Web servers—this process may generate an enormous amount of network traffic, resulting in performance issues. That is, the repeated client requests for authentication may take up a network's bandwidth unnecessarily and cause a slowdown in network traffic.

Centralized Authentication Systems are commonly deployed in enterprise computer systems and the public internet. These systems may also be referred to as Single-Sign-On (SSO) solutions. In one embodiment, an SSO solution may be a property of access control of multiple related, but independent software systems. With this property a user may log in once and gain access to all systems without being prompted to log in again at each of the different systems or networks. As different applications and resources support different authentication mechanisms, SSOs may have to internally translate to and store different credentials as compared with what may initially have been used for authentication.

In an exemplary Centralized Authentication System, the responsibilities for maintaining user accounts and authenticating users may be managed by one central authority. Service providers may utilize the central authority to authenticate users before providing access to them. In this exemplary system, service providers may not be charged with having to maintain and secure all the credential information of the users. That is, the task of authenticating the users may be delegated to a service provider with extensive experience and background in the field of authentication. Additionally, different service providers may share the same user accounts without having to duplicate the same user data across multiple sites. The Centralized Authentication System may reduce user login errors by having a single—and consistent—login form and process. In addition, having a single, well-publicized URL for the login page, may help thwart phishing attempts through fake login screens with unknown URLs. In the exemplary system, a user who has logged in at the central authentication server may move seamlessly from one service provider to the next, without having to be re-authenticated each time the user crosses service provider boundaries. When a user logs in at the centralized authentication server, all credentials may be submitted directly, by the user, to the authentication server; that is, the service provider may have no access to sensitive user credentials.

Security tokens may be used to prove one's identity electronically. The token may be used in addition to, or in lieu of, a password and/or user credentials to prove that the client or customer is who they claim to be. Further, the token may act as an electronic key to allow or grant access to a specific network or service. In most instances of Centralized Authentication Systems, security tokens may be used once a user has been properly authenticated, i.e., logged in. In some embodiments, a security token may be a type of authentication security device that may be used to authorize the use of computer services or computing devices. The security token may typically be a piece of serialized data that may be easily passed from one network host to another. In some embodiments, the token may only be meaningful to the Centralized Authentication System that issued the token. This token may be used by the holder of the token to request additional user information, or to confirm authorization of specifically requested actions. Due to security reasons, tokens may be short-lived, i.e., expire after a certain amount of time. This is to prevent a leaked token from being used repeatedly for malicious intent. Some exemplary implementations may require a short-lived token to be exchanged for a longer-lived token. Some implementations may allow tokens to be refreshed before they expire. Other exemplary implementations may issue single-use, short-lived tokens that may only be used once, and not be exchanged or refreshed. Yet, other implementations may issue multiple-use, long-lived tokens which are essentially replacements of actual user credentials.

Caching is an operation that may be used in data processing systems. Data that is likely to be used multiple times may be stored in higher-speed, random-access memory so that they may be retrieved repeatedly and very quickly. In that respect, caching may be used to improve performance by reducing the time required to access that data. Caching is used extensively in processors, e.g., L1/L2 cache, hard disk drives, e.g., buffer cache, networking, e.g., ARP cache, and client-server systems, e.g., memcached. In one embodiment, by using caching, the overall performance of the system may be improved, i.e., provide faster read requests and responses.

A Centralized Authentication System utilizing a short-lived, single-use token, may only be authenticated once per session. That is, the issued single-use security token may not be re-used again, and accordingly, in one example, when a user has been authenticated and authorized, the service provider may need to allow the user to remain logged in to the service provider site. An exemplary use case may be a SOAP, REST, or custom HTTP client that uses HTTP Basic Authentication. A client that sends security tokens to the service provider would not be able to re-use that token more than once. After the first data exchange, the token is invalidated, and accordingly, subsequent usages of the same token would result in errors.

For the case of multiple-use long-lived security tokens, a client that repeatedly calls a service provider for each individual operation may cause the service provider to make frequent verification requests to the centralized authentication server. Since each operation has to be verified by the centralized authentication server individually, the overall system performance may suffer dramatically.

For login scenarios whereby single-use security tokens are submitted by a client to the service provider, the service provider only has one opportunity to verify the token with the centralized authentication server. If the same token is submitted later for subsequent operations within the same logged-in session, no token verification may be performed. For login scenarios whereby multiple-use security tokens are submitted by a client to the service provider, every operation request by the client causes a verification request by the service provider to the centralized authentication service. This increases network traffic and degrades system performance.

In one embodiment of the present Centralized Authentication System, the security token may be cached locally within the service provider when a token is verified successfully. A time-expiry Least-Recently-Used (LRU) cache system may be used to cache verified-and-valid tokens, as well as to invalidate expired tokens. In these embodiments, new tokens are added to the cache, displacing the least-recently-used tokens. Expired tokens may be removed from the cache altogether based on an expiration time. The expiration time may be calculated using, for example, a sliding window algorithm or fixed elapsed time. The specific method used may depend on the nature of the security token, i.e., whether it is a single-use security token or a multiple-use security token.

Embodiments of the Centralized Authentication System may utilize caching of single-use security tokens in order to allow the re-use of invalidated tokens. Additionally, embodiments may utilize caching of multiple-use security tokens in order to improve performance by enabling local authentication. In one embodiment, adding a time-expiry attribute to the LRU cache, in conjunction with the usual least-recently-used logic, may provide for an applicable and efficient system. The system may then choose the proper time-expiry algorithm to use based on the nature of the security token.

Figure 1:
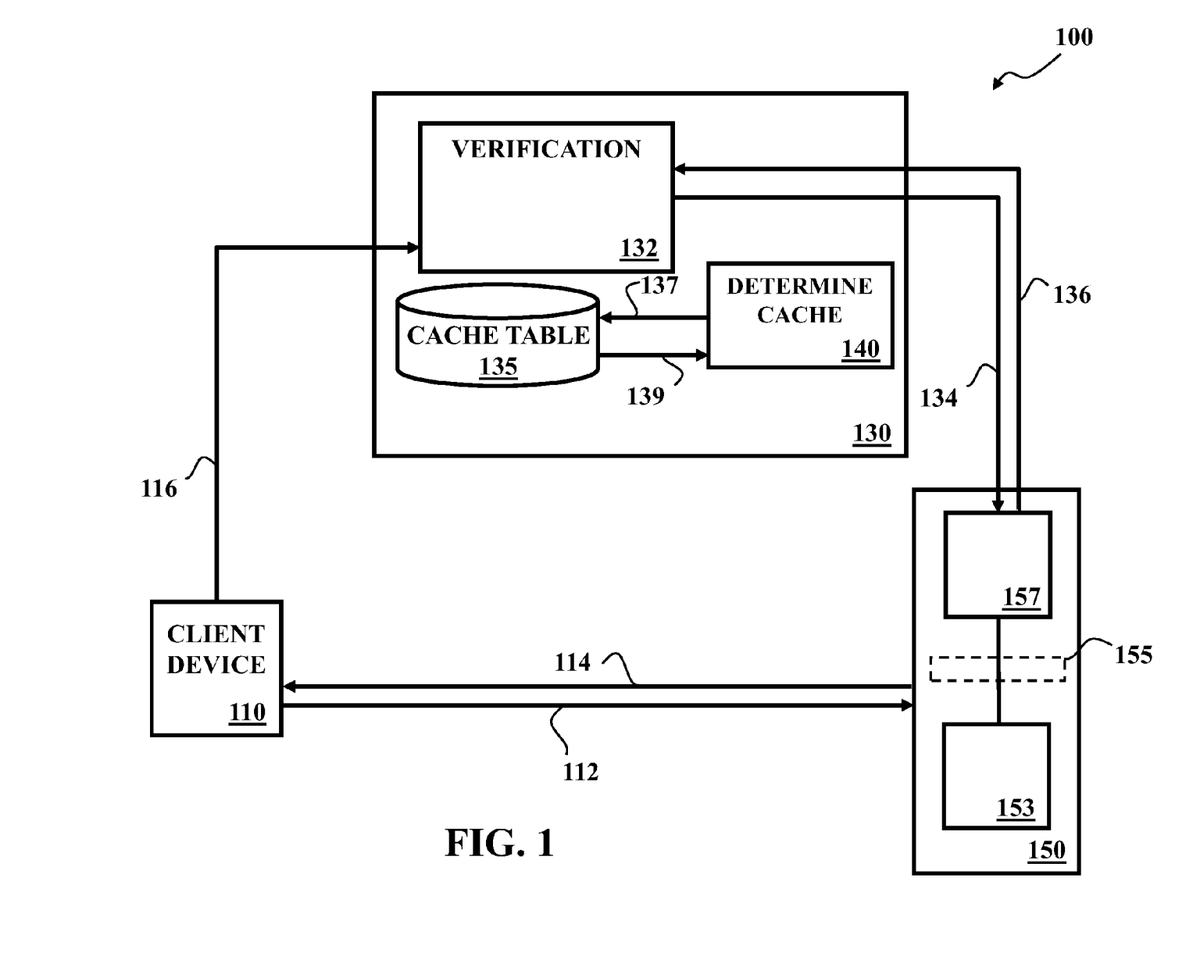
FIG. 1 depicts, in a functional block diagram, an exemplary embodiment of the Centralized Authentication System comprising a set of computing devices.

FIG. 1 depicts in a functional block diagram, an embodiment of the Centralized Authentication System 100, where the system is comprised of a set of computing devices, having the computing devices connected together via a network link. Embodiments of the Centralized Authentication System 100 may comprise a client device 110, an application server 130, and an authentication server 150. In this embodiment, the client device 110 may submit any combination of single or multiple user credentials 112, e.g., user name, password, login name, screen name, nickname, handle, birthdate, and/or biometric information, such as a picture or a finger print, to a computing device node 153 at the authentication server 150. In some embodiments, the authentication server 150 may comprise an optional firewall 155, where the firewall 155 may reside between the computing device nodes 153, 157. Optionally, the application server 130 may access any node or resource behind the optional firewall 155. Additionally, the user credentials may be encrypted via different cryptography methods which may take the form of machine-readable cryptographic keys and/or passwords. Cryptographic credentials, e.g., an X.509 certificate, may be self-issued, or issued by a trusted third party; based on a set of criterion for issuance of the credentials. In some exemplary embodiments, the credentials may be designed to expire after a certain period. Upon validation of the received user credentials by the authentication server 150, the client device 110 may then receive a security token 114 from the authentication server 150 in return for, and based on, the provided credentials 112. The client device 110 may then send 116 the received security token 114 from the authentication server 150 to the application server 130. Once received by the application server 130, the application server may verify 132, via a verification process 134, 136, the security token 114 with a computing device node 157 at the authentication server 150 and determine whether to allow or deny access to the client device based on the security token verification. That is, if the verification is successful, the application server 130 may allow access to the client device 110. The application server 130 may then determine 140 the disposition or nature of the security token 114 based on whether the received security token is a single-use token or a multiple-use token. Once the determination is made 140, the application server may associate 137, 139 the security token 114 with a corresponding cache table 135 based on the determined nature of the token. In one exemplary embodiment, the cache table 135 may be selected from two separate and distinct cache tables, where one exemplary cache table comprises single-use token entries and another exemplary cache table comprises multiple-use token entries. Optionally, the cache table 135 may be selected from a plurality of cache tables.

In one embodiment, the application server 130 may then cache the security token 114 based on the associated cache table and determine a time-expiry algorithm based on the cached security token, the nature of the security token, and cache table. In one embodiment, caching schemes, i.e., replacement policies, may utilize a time-expiry algorithm or structure to manage the cached information stored in the cache table. When the cache table or memory is full, the algorithm may need to determine which tokens to discard so as to make room for new tokens. Some existing exemplary cache algorithms may use, for example, the latency, the hit rate, and a number of secondary factors to determine the cache performance.

Figure 2:
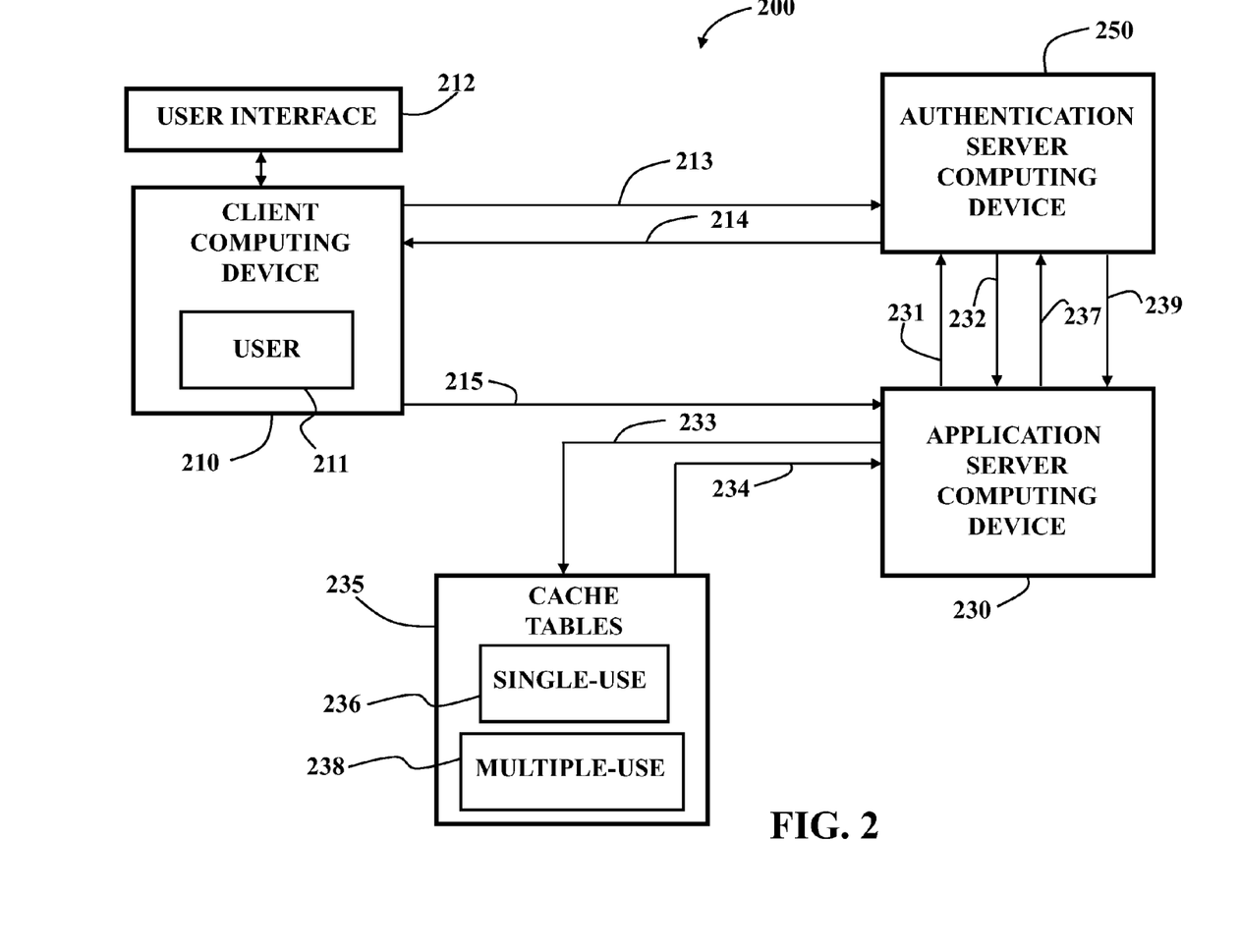
FIG. 2 depicts, in a functional block diagram, an exemplary embodiment of the Centralized Authentication System, where the application server is highlighted as communicating with the client computing device and the authentication server.

FIG. 2 depicts in a functional block diagram, an embodiment of the Centralized Authentication System 200, where the application server 230 is highlighted as communicating with the client computing device 210 and the authentication server 250. The application server 230 is also depicted as comprising a set of cache tables 235, one for storing single-use security tokens 236 and one for storing multiple-use security tokens 238. The client device 210, via an optional user interface 212, may initiate a verification process with the authentication server 250 through a separate communication channel 213, 214 and is assumed to have already been granted a security token based on the user credentials the client provided to the authentication server 250. The application server 230 may then receive 215 the security token from the client device 210 and initiate the caching process. Upon receiving the security token, the application server 230 may send a verification request 231 to the authentication server 250 and receive a response 232 in return. Accordingly, since the client device, i.e., user 211, has already been granted a security token through a different, out-of-band, channel from the authentication server 250, the application server 230 need only merely verify the granted security token with the authentication server 250, and based on the verification result either allow or deny access to the user. Additionally, if the verification succeeds, the security token—not user credentials—may be cached by the application server 230 for future use. In one embodiment, the token cache may be time-constrained so that the token expires after a certain time limit. The time limit and expiration algorithm used may be determined based on the nature of the token, i.e., whether it is multiple-use or single-use. That is, the application server 230 may determine whether the security token has a disposition of being a single-use token or a multiple-use token. Once the disposition is determined, the security token is sent 233 to the cache table 235 for storing and retrieval 234 at a later time.

As new security tokens are received, they may be stored in the corresponding cache table 235 with a calculated timeout value. Accordingly, when the application server 230 receives a login request from the client device 210, it may reference the associated cache table 235, either single-use cache table 236 or multiple-use cache table 238. If a cache hit is determined to be present, i.e., the entry is already in the cache table and not expired, the application server may retrieve the security token quickly from its cache table, thereby reducing network traffic between the application server and the authentication server; and the client device and the authentication server. If a cache miss occurs, i.e., the entry is not in the cache table or is expired, the application server 230 may revalidate—in a multiple-use token case only—the client device 210 with the authentication server 250 by sending 237 a validation request and receiving a response 239 from the authentication server 250.

Figure 3:
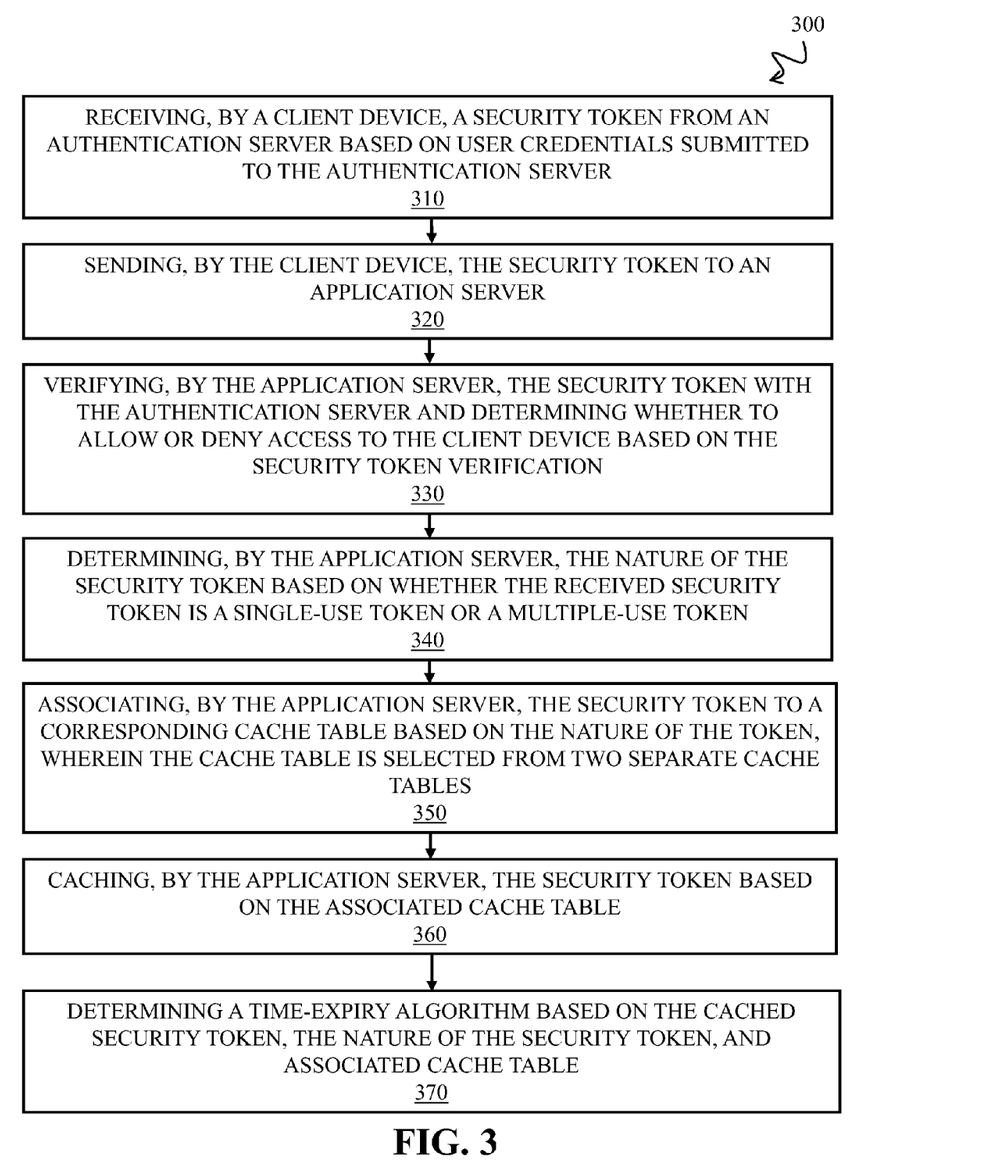
FIG. 3 depicts, in a top-level flowchart, an exemplary method of implementation of the Centralized Authentication System.

Embodiments may include an exemplary method of implementation of a Centralized Authentication System 300, as illustrated in a top-level flowchart of FIG. 3. The exemplary steps of the system and associated computing devices may comprise the following steps: (a) receiving, by a client device, a security token from an authentication server based on user credentials submitted to the authentication server (step 310); (b) sending, by the client device, the security token to an application server (step 320); (c) verifying, by the application server, the security token with the authentication server and determining whether to allow or deny access to the client device based on the security token verification (step 330); (d) determining, by the application server, the nature of the security token based on whether the received security token is a single-use token or a multiple-use token (step 340); (e) associating the security token to a corresponding cache table based on the nature of the token, where the cache table may be selected from two separate and distinct cache tables (step 350); (f) caching, by the application server, the security token based on the associated cache table (step 360); and (g) determining a time-expiry algorithm based on the cached security token, the nature of the security token, and cache table (step 370).

In an embodiment where the cache table may utilize a Least-Recently-Used (LRU) algorithm, the system discards the least recently used tokens first. This algorithm requires keeping track of what was used and when it was used. In embodiments where every application program interface (API) call may require authentication, e.g., REST API and WebDAV, the central authentication scheme may experience very noticeable performance degradation due to repeated authentication. Accordingly, making frequent authentication requests to the centralized authentication server may not be recommended for performance reasons. The LRU cache implementation referenced above may reduce the amount of network traffic necessary to the centralized authentication server. In this embodiment, a time-expiry mechanism may be added on top of the standard LRU cache in order to avoid having any lingering stale credentials, as well as to allow single-use tokens to be used after an initial use.

In an exemplary application of the Centralized Authentication System, the initial LRU cache implementation may pre-allocate, for example, thirty thousand (30,000) entries. When the cache is full, the least-frequently accessed entry gets pushed out and discarded. The number of entries may be adjusted based on the expected number of concurrent active users on the system. Accordingly, the system may predict the expected number of concurrent active users based on a hysteresis effect. In this example, there are two timeout values defined for the exemplary LRU cache: LOGIN_CACHE_TIMEOUT and TOKEN_CACHE_TIMEOUT. The LOGIN_CACHE_TIMEOUT determines the timeout value for logins using multiple-use tokens. The TOKEN_CACHE_TIMEOUT determines the timeout value for logins using single-use tokens. The two logins may be differentiated because for logins using multiple-use tokens, it is possible to repeatedly authenticate with the centralized authentication server using the same token. However, for logins using single-use token, there is no opportunity to re-use the token after initial use. As such, it is mandatory to cache successful token logins and authenticate locally, independent of the centralized authentication server. In this exemplary application of the system, the current initial value of LOGIN_CACHE_TIMEOUT is set at ten (10) seconds, and TOKEN_CACHE_TIMEOUT is set at thirty (30) minutes. The other major difference between logins through multiple-use tokens and logins through single-use tokens may be that the timeout interval for the former may be absolute, whereas the timeout interval for the latter may employ a sliding window algorithm.

Multiple-Use Token Example

Figure 4:
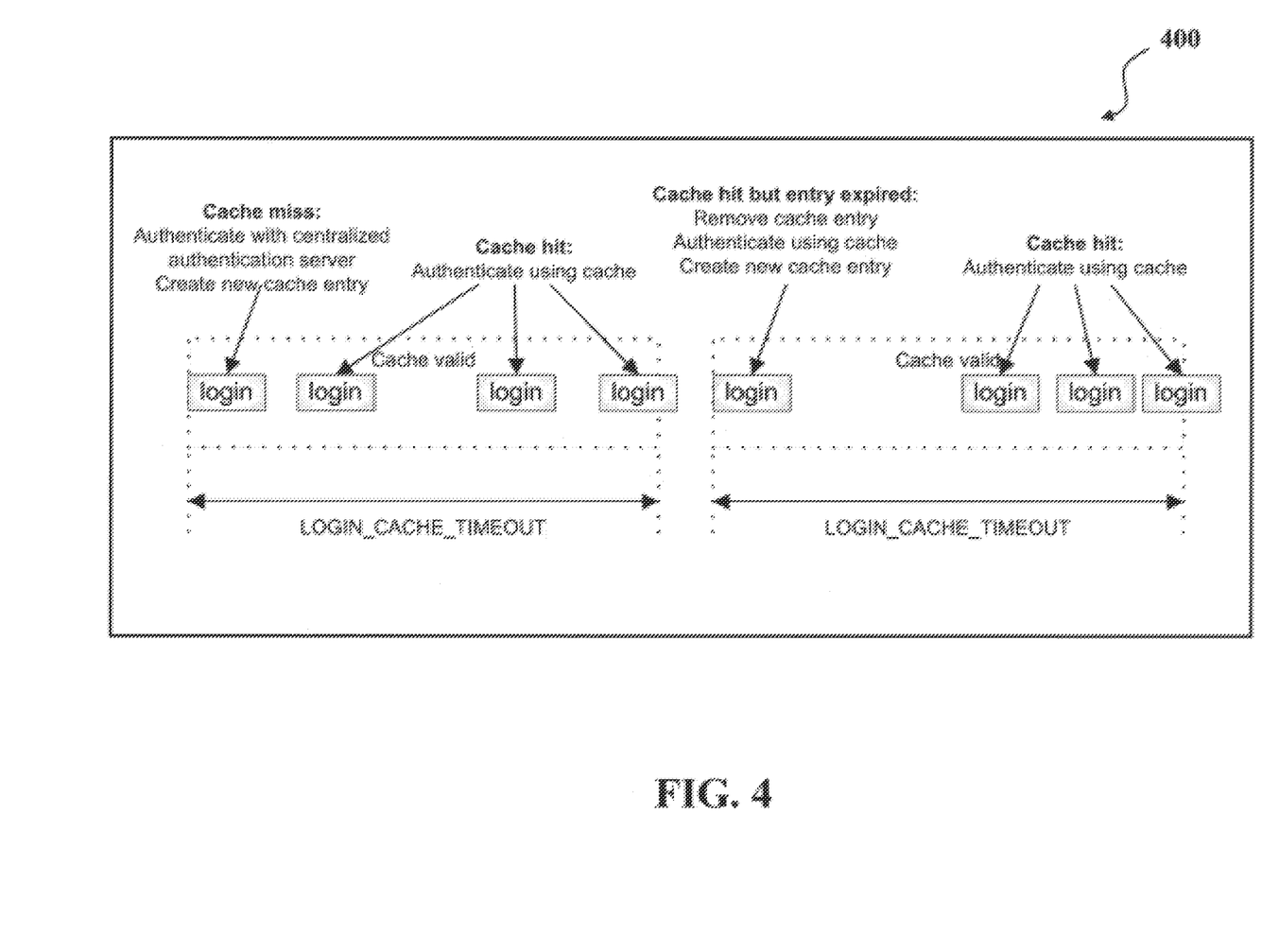
FIG. 4 depicts a graphical representation of a multiple-use token login and caching process.

FIG. 4 depicts a graphical representation of a multiple-use token login and caching process 400. For login using multiple-use tokens, the system may start by assuming that a successful login with the centralized authentication server has occurred. Since this is the first login, there is no existing entry in cache, therefore the login information is added to cache, and the timeout value is set to Tlogin_exp=Tnow+LOGIN_CACHE_TIMEOUT. If any additional requests with the same token occur before Tlogin_exp, authentication is performed locally without contacting the centralized authentication server. If authentication occurs after Tlogin_exp, the cache entry is purged, and authentication is performed normally with the centralized authentication server. If login is successful, the entire sequence may be repeated. A larger value of LOGIN_CACHE_TIMEOUT reduces the amount of communications with the centralized authentication server and improves performance, however it increases the risk of stale cache data. For example, if a user changes their password at the centralized authentication server, the new password would take effect at an exemplary DMS only when the cache entry has expired, and authentication with the centralized authentication server has occurred.

Single-Use Token Example

Figure 5:
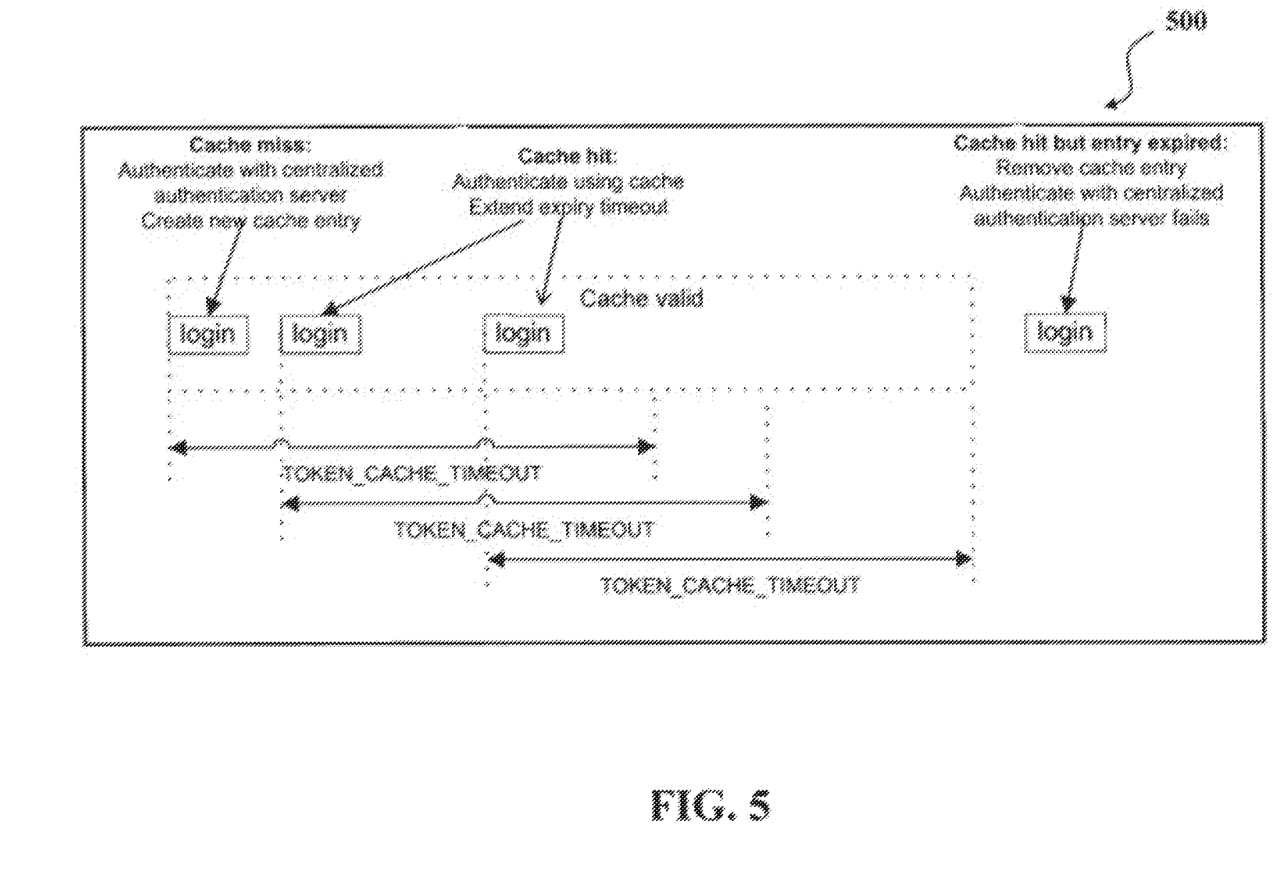
FIG. 5 depicts a graphical representation of a single-use token login and caching process.

FIG. 5 depicts a graphical representation of a single-use token login and caching process 500. For login using single-use tokens, the system may start by assuming that a successful login with the centralized authentication server has occurred. Since this is the first login, there is no existing entry in cache, the login information is added to cache, and timeout is set to Tlogin_exp=Tnow+TOKEN_CACHE_TIMEOUT. If any additional authentication requests with the same token occur before Tlogin_exp, login authentication is performed locally without contacting the centralized authentication server. This is necessary as the tokens are single-use, so they cannot be re-used for subsequent logins. For each login request with that token, the timeout value is updated to Tlogin_exp=Tnow+TOKEN_CACHE_TIMEOUT. As a result, the expiration time is extended by TOKEN_

CACHE_TIMEOUT for each successive login. If a login occurs after Tlogin_exp, the cache entry is purged, and authentication is performed with the centralized authentication server. If login is successful, the entire sequence is repeated. A larger value of TOKEN_CACHE_TIMEOUT increases the session stay-alive interval, but increases the risk of stale cache data. If a user initiates a large number of separate login sessions with an exemplary DMS, each session—with a unique token—takes up space in the cache. Since token logins have relatively long expiration times, unused cache entries waste precious memory space.

In one embodiment of the Centralized Authentication System, during the first iteration of LRU cache implementation, cache entries for multiple-use token logins and single-use token logins may be stored in the same cache table. Utilizing a single global cache table may have the inherent disadvantage of frequently-accessed entries displacing less-frequently accessed but valid entries. Considering that single-use token cache entries have longer expiration times, it is possible for inactive but valid single-use token cache entries to be discarded when the cache table is full. This is highly undesirable, as single-use token logins cannot be re-authenticated; since these tokens may only be used once. If such a situation arises, the only recourse would be to go through the entire login process again in order to obtain a new, valid, single-use token. In one embodiment, the system may detect this situation and then switch to a more robust architecture where two separate cache tables, one for multiple-use token logins and one for single-use token logins, are created and maintained. According to the split cache table structure scheme, the multiple-use token cache size may be made smaller, as its main purpose may be to reduce communications with the centralized authentication server. If there is a cache miss, the only negative consequence would be re-authentication with the centralized authentication server, followed by recreation of a new cache entry. The single-use token cache size, however, may need to be made as large as possible to accommodate the maximum number of concurrently logged-in tokens supported. This is to prevent valid, unexpired single-use token logins from being discarded. Since there is no way to re-authenticate these tokens, it is very important to prevent this condition from happening.

Figure 6:
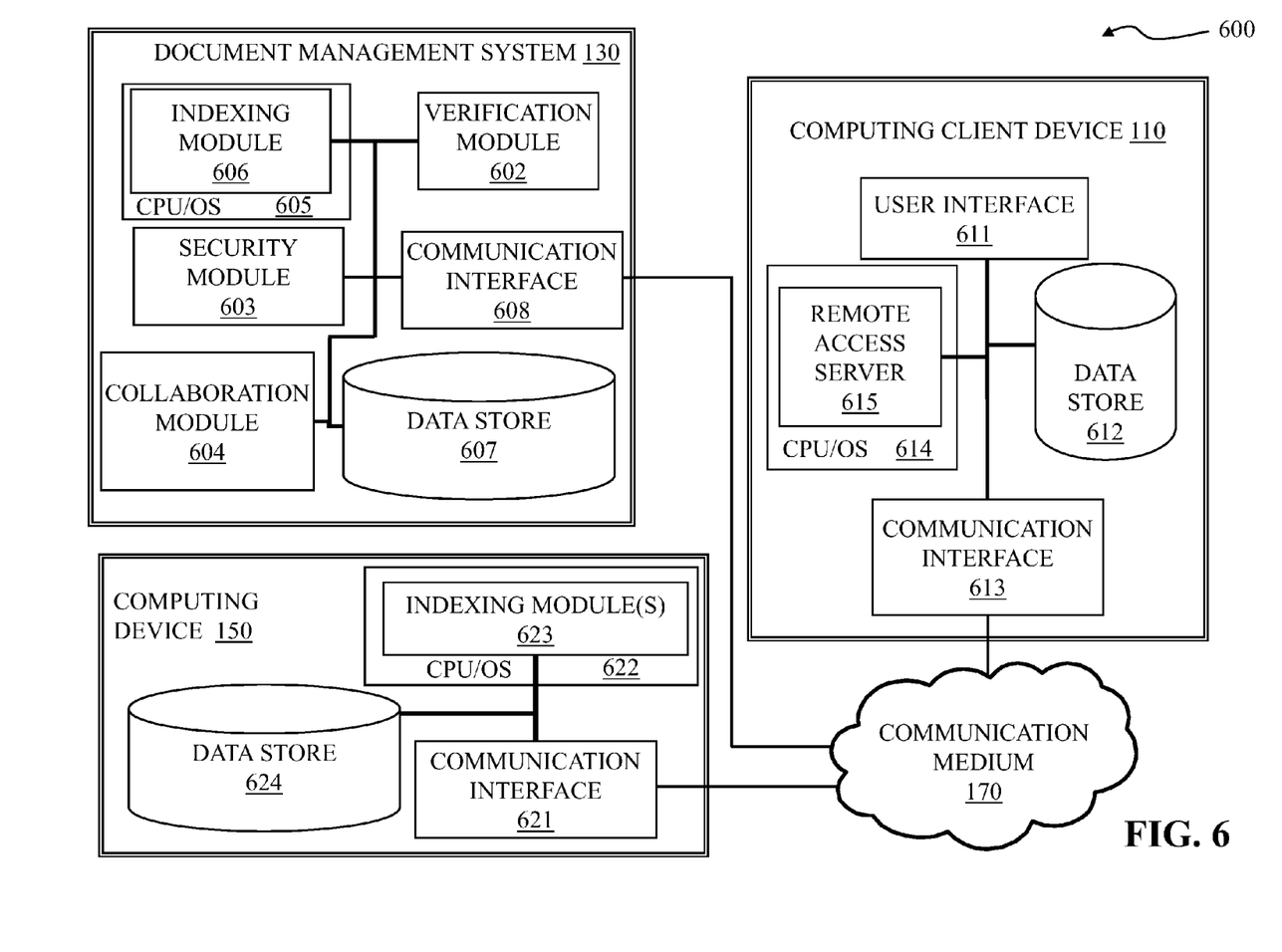
FIG. 6 depicts an exemplary embodiment where the networked system comprises a computing client device, a Document Management System (DMS) device, and a computing authentication server device.

FIG. 6 illustrates an exemplary embodiment of FIG. 1 in greater detail where the networked system 600 comprises a computing client device 110, a Document Management System (DMS) device 130, and a computing authentication server device 150 networked via a communication medium 170. As an exemplary application server node, the DMS device 130 is illustrated as having a verification module 602, a security module 603, a collaboration module 604, a central processing unit (CPU) 605 having an operating system (OS) configured to host the DMS indexing module 606. A data store 607 may be present to store the one or more generated user security tokens received from the computing authentication server device 150 received via the communication interface 608. As an exemplary client node, the computing client device 110 is illustrated as having a user interface 611, a data store 612, a communication interface 613, and a CPU 614 having an OS configured to host a remote access server. As an exemplary authentication server node, the computing authentication server device 150 is illustrated as having a communication interface 621, a CPU 622 having an OS configured to host a server and one or more indexing modules 623 configured to access a data store 624, e.g., storing and reading to/from a table, to serve computing node verifications and/or password authentication for computing nodes responsive to one or more communications from the DMS device 130.

Figure 7:
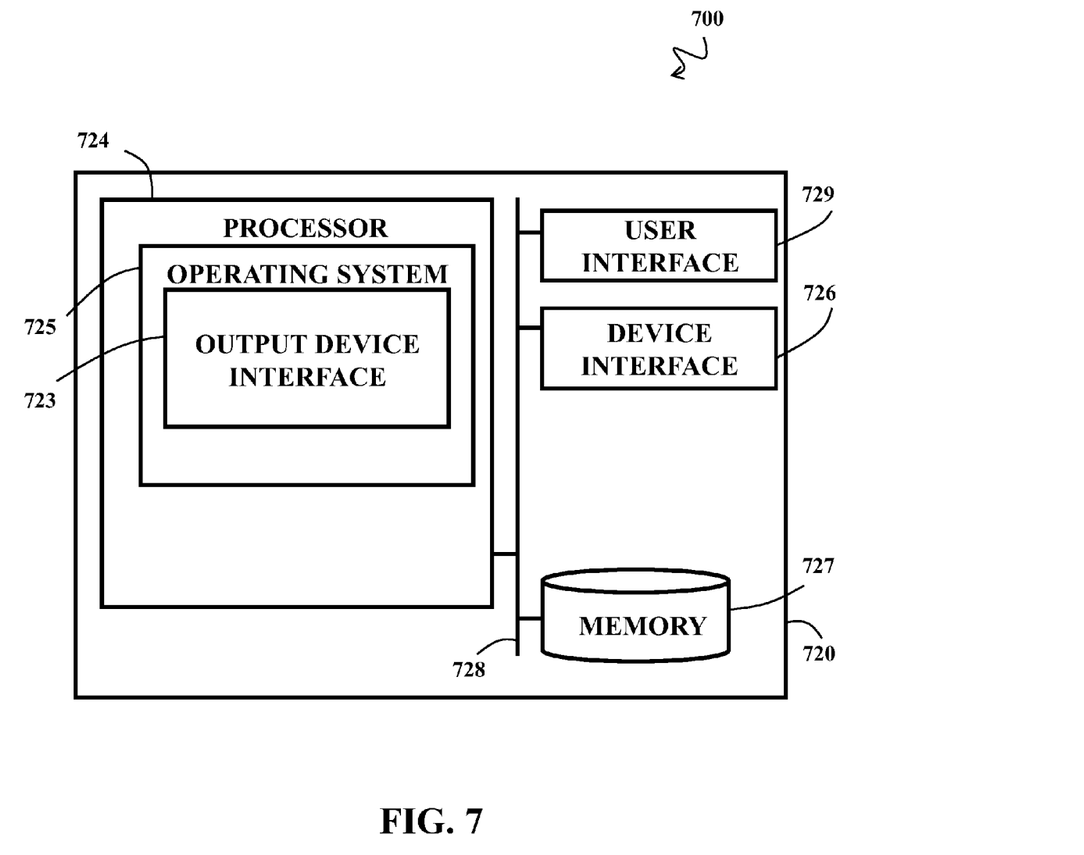
FIG. 7 depicts an exemplary top level functional block diagram of a computing device embodiment.

FIG. 7 illustrates an exemplary top level functional block diagram of a Centralized Authentication System embodiment 700 comprising a plurality of computing devices. The exemplary operating environment is shown as a computing device 720 comprising a processor 724, such as a central processing unit (CPU); an addressable memory 727, such as a lookup table having an array; an external device interface 726, such as an optional universal serial bus port and related processing, and/or an Ethernet port and related processing; an output device interface 723; and an optional user interface 729, such as an array of status lights, and/or one or more toggle switches, and/or a display, and/or a keyboard and/or a pointer-mouse system and/or a touch screen. A user interface may also have at least one user interface element. Examples of user interface elements comprise: input devices including manual input such as buttons, dials, keyboards, touch pads, touch screens, mouse and wheel related devices, and voice and line-of-sight interpreters. Additional examples of user interface elements comprise output devices including displays, tactile feedback devices, and auditory devices. Optionally, the addressable memory may, for example, be: flash memory, SSD, EPROM, and/or a disk drive and/or another storage medium. These elements may be in communication with one another via a data bus 728. An operating system 725, such as one supporting the execution of applications, may comprise a processor 724 which may be configured to execute steps of an application server computing device to determine caching of a security token based on the nature and disposition of the token and determine a time-expiry algorithm based on the cached security token, the nature of the security token, and cache table.

The exemplary embodiment of the Centralized Authentication System may cache security tokens in the application server and the application server may then verify the granted security token with the authentication server, and allow or deny access to the client. If the verification sequence with the authentication server succeeds, the token is cached for future use. The application server caches security tokens locally and makes decisions on time limit and expiration algorithm to use based on the nature of the token. The token cache is time-constrained so that it expires after a certain time limit. The time limit and expiration algorithm used are determined based on the nature of the token, i.e., whether it is multiple-use or single-use. That is, in this embodiment, the decision-making logic is primarily on the application server, independent of the authentication server. Additionally, the token string itself is cached and since the security token is generated only after a successful login, no unencrypted password is cached in this implementation.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described.

What is claimed is:
1. A method comprising:
receiving, by a client device, a security token from an authentication server based on user credentials submitted to the authentication server;
sending, by the client device, the security token to an application server;

verifying, by the application server, the security token with the authentication server and determining whether to allow or deny access to the client device based on the security token verification;

determining, by the application server, a disposition of the security token based on whether the received security token is a single-use token or a multiple-use token;

associating, by the application server, the security token with a corresponding cache table based on the determined disposition of the token;

caching, by the application server, the security token based on the associated cache table;

determining a time-expiry algorithm for the cache table based on the cached security token, the disposition of the security token, and associated cache table, and wherein the time-expiry algorithm determines a timeout interval for the security token and the timeout interval is longer for a single-use token than the timeout interval for a multiple-use token; and managing the cache table based on the determination of the time-expiry algorithm.

2. The method of claim 1, wherein the security token is a token string and determined based on an authentication of the user credentials.

3. The method of claim 1 further comprising:
selecting the associated cache table for caching the security token; and
storing the security token in the cache table for future retrieval.

4. The method of claim 1 wherein the timeout interval for the security token having a multiple-use token disposition is based on an absolute algorithm.

5. The method of claim 1, wherein a number of entries for the cache table is determined based on an expected number of concurrent active users in the application server.

6. The method of claim 1, wherein the cache table is selected from two separate cache tables.

7. The method of claim 6, wherein the two separate cache tables store a different number of entries from each other.

8. The method of claim 6, wherein the two separate cache tables are unique from each other.

9. The method of claim 6, wherein the two separate cache tables comprise a first cache table for storing single-use tokens and a second cache table for storing multiple-use tokens.

10. The method of claim 1 further comprising:
determining, by the application server, a timeout interval for the security token based on the determined time-expiry algorithm.

11. A device comprising:
a processor and addressable memory, the processor configured to:
receive a security token from a client device;
verify the security token with an authentication server and determine whether to allow or deny access to the client device based on the security token verification;
determine a disposition of the security token based on whether the received security token is a single-use token or a multiple-use token;
associate the security token with a corresponding cache table based on the disposition of the token, wherein the cache table is selected from two separate cache tables;
cache the security token based on the associated cache table;
determine a time-expiry algorithm based on the cached security token, the disposition of the security token, and associated cache table, wherein the time-expiry algorithm determines a timeout interval for the security token and wherein the timeout interval is longer for a single-use token than the timeout interval for a multiple-use token; and
manage the cache table based on the determined time-expiry algorithm.

12. The device of claim 11, wherein the processor is further configured to:
save the security token to the cache table; and
retrieve the security token from the cache table.

13. The device of claim 11, wherein the received security token from the client device has already been authenticated by the authentication server.

14. A centralized authentication system for security token caching, the centralized authentication system comprising:
a first computing device, wherein the first computing device comprises a processor and an addressable memory, the processor configured to:
transmit a set of one or more user credentials associated with a user to a second computing device;
receive a security token from the second computing device based on the one or more user credentials being authenticated successfully; and
send the security token to a third computing device;
the second computing device, wherein the second computing device comprising a processor and an addressable memory, the processor configured to:
receive from the first computing device the set of one or more user credentials associated with the user;
authenticate the received set of one or more user credentials; and
validate a received security token of the user in response to a verification request from the third computing device;
the third computing device, wherein the third computing device comprises a processor and an addressable memory, the processor configured to:
verify the security token with the second computing device;
determine whether to allow or deny access to the first computing device based on the security token verification;
determine a disposition of the security token based on whether the received security token is a single-use token or a multiple-use token;
associate the security token with a corresponding cache table based on the disposition of the token, wherein the cache table is selected from two separate cache tables and wherein the two separate cache tables comprise a first cache table for storing single-use tokens and a second cache table for storing multiple-use tokens;
cache the security token based on the associated cache table;
determine a time-expiry algorithm based on the cached security token, the disposition of the security token, and associated cache table; and
manage the cache table based on the determined time-expiry algorithm.

15. The system of claim 14, wherein the first computing device is a client computing device, the second computing device is an authentication server, and the third computing device is an application server.

16. A method comprising:
receiving, by a client device, a security token from an authentication server based on user credentials submitted to the authentication server;
sending, by the client device, the security token to an application server;
verifying, by the application server, the security token with the authentication server and determining whether to allow or deny access to the client device based on the security token verification;
determining, by the application server, a disposition of the security token based on whether the received security token is a single-use token or a multiple-use token;
associating, by the application server, the security token with a corresponding cache table based on the determined disposition of the token, wherein the cache table is selected from two separate cache tables and wherein the two separate cache tables comprise a first cache table for storing single-use tokens and a second cache table for storing multiple-use tokens;
caching, by the application server, the security token based on the associated cache table; and
determining a time-expiry algorithm for the cache table based on the cached security token, the disposition of the security token, and associated cache table; and
managing the cache table based on the determined time-expiry algorithm.

\* \* \* \* \*